Aug. 2, 1960  C. H. V. SAWYER ET AL  2,947,443
DEVICES FOR RELEASING FLUID PRESSURE
Filed June 16, 1958
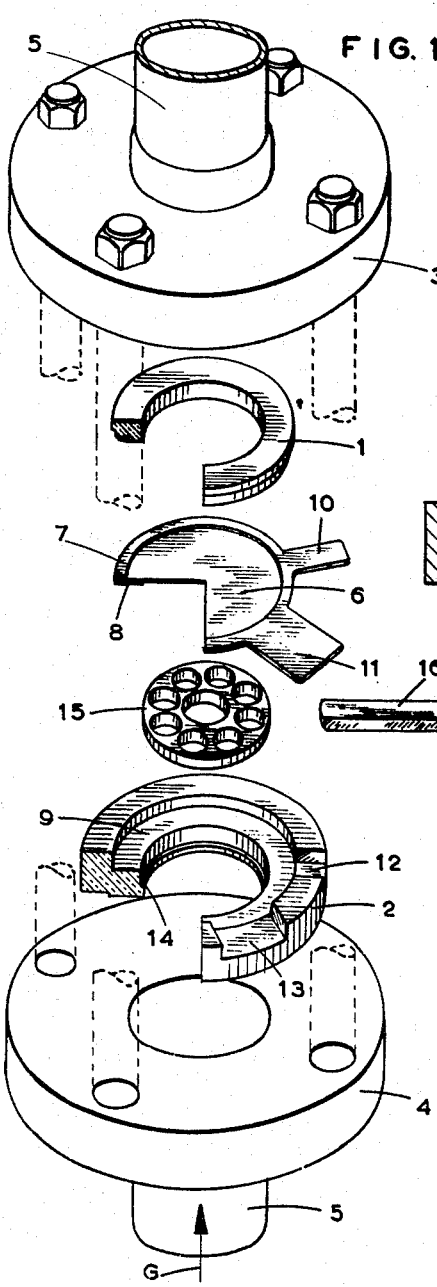
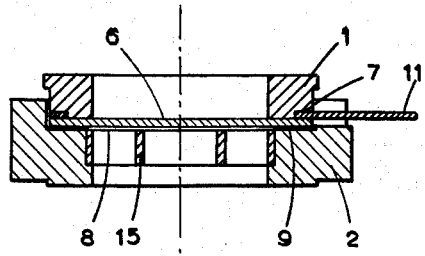
INVENTORS
CHARLES HENRY VICTOR SAWYER
PETER EDMUND LANDEG
BY
William R. Liberman
ATTORNEY

2,947,443

DEVICES FOR RELEASING FLUID PRESSURE

Charles Henry Victor Sawyer and Peter Edmund Landeg, Hayes, England, assignors to C. D. Patents Limited, London, England, a British company Filed June 16, 1958, Ser. No. 742,425

Claims priority, application Great Britain July 1, 1957

2 Claims. (Cl. 220—89)

This invention relates to devices for releasing fluid pressure.

Pressure vessels have to be provided with devices which automatically release fluid pressure inside the vessel when there is an overload of pressure inside the vessel. One such device is a bursting or rupture disc which is usually a metallic membrane designed to burst or rupture at a desired pressure. Such a metallic disc has the disadvantage that it is subject to fatigue caused by continued stressing of the disc and by the effects of temperature while for use at low pressures it is necessary to have very thin membranes the operation of which is seriously affected by the slightest corrosion. For this reason, the working pressure of a vessel fitted with a metallic bursting disc must be low in relation to the pressure at which the disc is designed to rupture.

Carbon or graphite bursting discs have been proposed and they have the advantage that they are not affected by changes in temperature, are resistant to most chemicals and can be safely operated up to a working pressure of about 75% of the designed bursting pressure. Furthermore, such discs can be comparatively thick owing to the low tensile strength of carbon or graphite so that such a disc can be manufactured with considerable accuracy of thickness (and therefore of bursting pressure) and it is possible easily to make discs of different thicknesses for different bursting pressures. It is an object of the present invention to provide an improved such disc. According to the invention, a pressure releasing device comprises a holder which has two mating parts co-operating to provide a passage through which fluid can pass, but which is normally closed by a bursting disc of carbon or graphite, the said disc having, secured to the marginal portions of each of its two faces, gaskets which are clamped between the two mating parts.

Bursting discs sometimes have to operate under conditions in which a reversal of pressure can take place such as when a vessel is alternately subjected to pressure and vacuum. For example, it may sometimes be desirable for a bursting disc to rupture at a pressure of say 10 lbs. per square inch although it must not rupture under vacuum equivalent to a reversed load of 14 lbs. per square inch. In these circumstances, a vacuum support must be provided on the "up stream" side of the disc i.e. the side subjected to pressure when the device is in use. The device provided by the present invention can therefore have the up stream part of the holder recessed to receive a support device which is spaced from the disc by such a distance that limited deflection of the disc is permitted, but not sufficient deflection to cause fracture.

A preferred embodiment of the invention is illustrated in the accompanying drawings of which:

Fig. 1 is an exploded perspective view of a pressure release device,

Figure 2 is a cross-section through the same device.

The release device for a fluid pressure vessel illustrated comprises a holder which is made of carbon, metal or other suitable material and includes two generally cylindrical parts 1, 2 having axial passages. This holder can be clamped between two flanges 3, 4 in pipe-work 5 of the pressure vessel (not shown) and gas can pass through the pipe-work in the direction of the arrow G. A marginal portion of a bursting disc 6 of carbon or graphite with annular gaskets 7, 8 cemented to each face adjacent its periphery is engaged and clamped between the two parts, 1, 2 to close the gas passage formed by co-operating axial passages of the two parts. The upstream part 2 of the holder is recessed to provide an internal support shoulder 9 on which the upstream gasket 8 of the bursting disc 6 can rest. The downstream part 1 of the holder can also fit in this recess and support the marginal portion of the disc 6 on its downstream side. In an alternative arrangement (not illustrated) a downstream support for the disc 6 can be provided by recessing the downstream part 1 of the holder to form an internal support shoulder.

The bursting disc 6 is flat on both faces so that it can be produced by a simple manufacturing operation and stress concentrations are reduced to a minimum. It has been found that the bursting pressure of a bursting disc can be greatly affected by the presence of sharp corners or radii adjacent the marginal portion of the disc, this being due to stress concentrations, and it is one of the advantages of this invention that such concentrations of stress are reduced to a minimum.

The gasket 7 on the downstream side of the disc 6 is provided with two locating tabs 10, 11 which project from the edge of the disc are of different widths and can be arranged at any angle (except 180°) with respect to each other. The part 2 of the holder has two peripheral cut away portions or locating slots 12, 13 into which the tabs fit so as to locate the disc 6 in the correct position. The bursting pressure of the disc can be printed on the tabs. The tabs 10, 11 can, of course, be provided on the upstaream gasket 8 if desired. Bursting discs for use at different bursting pressures can have tabs of different widths and set at different angles. Holders can then be provided with differently spaced cut away locating portions 12, 13 depending on the particular bursting pressures at which they are to be used, the different sizes and angles of the tabs and cut away portions ensuring that the discs can only be fitted in the correct holders.

The upstream part 2 of the holder can have a second recess having a second internal support shoulder 14 on which is fitted a vacuum support member. This member can be a perforated carbon disc 15 or a carbon bar 16, is fixed against movement in the up stream direction, i.e. away from the disc and is spaced from the disc 6 at such a distance that the disc can flex to a limited amount in the upstream direction, but is prevented from deflecting sufficiently to cause a rupture. The vacuum support can also be arranged so that it is movable towards the disc so that it can be carried forward with the fluid in the downstream direction when the disc bursts.

What we claim is:

1. A device for releasing fluid pressure comprising a first mating part which has an axial fluid passage therein and is recessed to provide first and second internal support shoulders; a carbon bursting disc having flat faces to the marginal portion of each of which is secured an annular gasket, one of said gaskets being seated on said first support shoulder whereby said bursting disc closes said axial passage; a support member for said disc which member is supported by said second support shoulder and is spaced from said disc when said disc is in its normal, unflexed condition by an amount which permits said disc to flex towards said support member by an amount which is insufficient to cause said disc to rupture; and a second mating part seated on the other of said gaskets and having an axial fluid passage which communicates with the axial passage in said first mating part when said bursting disc is ruptured, one of said mating parts being provided with two angularly asymmetrically disposed locating slots of different configuration, and one of said gaskets having two locating tabs projecting edgewise therefrom engaged in said slots.

2. A device as claimed in claim 1, in which said locking tabs are integral with and project edgewise from the gasket seated on the first support shoulder.

References Cited in the file of this patent

UNITED STATES PATENTS

| | | |
|---|---|---|
| 1,250,680 | Sheldon | Dec. 18, 1917 |
| 1,429,296 | Obert | Sept. 19, 1922 |
| 1,774,165 | Black | Aug. 16, 1930 |
| 2,408,774 | Goddard et al. | Oct. 8, 1946 |
| 2,548,298 | Simons | Apr. 10, 1951 |
| 2,663,458 | MacGlashan | Dec. 22, 1953 |
| 2,772,019 | Jones | Nov. 27, 1956 |

FOREIGN PATENTS

| | | |
|---|---|---|
| 11,384 | Norway | June 3, 1902 |
| 474,956 | Great Britain | Nov. 10, 1937 |